March 6, 1973 B. AUTHIER ET AL 3,719,271

PACKING FOR SEMICONDUCTOR DISCS

Filed Nov. 12, 1971 2 Sheets-Sheet 1

INVENTORS
BERNHARD AUTHIER
HELMUT DECKERT
WERNER HOFBAUER
RUDOLF BAUER
BY D Malcolm
ATTORNEY March 6, 1973 B. AUTHIER ET AL 3,719,271

PACKING FOR SEMICONDUCTOR DISCS

Filed Nov. 12, 1971 2 Sheets-Sheet 2

INVENTORS
BERNHARD AUTHIER
HELMUT DECKERT
BY WERNER HOFBAUER
RUDOLF BAUER

D Malcolm
ATTORNEY

United States Patent Office 3,719,271
Patented Mar. 6, 1973

3,719,271

PACKING FOR SEMICONDUCTOR DISCS

Bernhard Authier and Helmut Deckert, Burghausen, Upper Bavaria, Werner Hofbauer, Munich, and Rudolf Bauer, Bavaria, Germany, assignors to Wacker-Chemitronic, Gesellschaft fur Elektronik-Grundstoffe m.b.H. Postfach, Burghausen, Upper Bavaria, Germany

Filed Nov. 12, 1971, Ser. No. 198,104
Int. Cl. B65d *57/00, 85/58*
U.S. Cl. 206—1 R 2 Claims

ABSTRACT OF THE DISCLOSURE

A packing for holding and shipping semiconductor discs comprising a can containing a bracket having rabbets in which the discs stand vertically with respect to the bottom of the can and are held fast with a certain tension. Thus the semiconductor discs do not rest on their flat surfaces, and therefore they cannot touch or scrape against each other. The can has a lid which may be sealed to the can by adhesive tape. The packing has the advantage that it makes possible the dust-free and breakage-free shipment of semiconductor discs of any size or thickness, so that any subsequent cleaning or further processing is avoided.

The packing of semiconductor discs presents special problems for the industry. The brittle discs are sensitive to any mechanical stress. Hence the danger exists that in case of improper packing the discs will break in transit. Moreover, the discs scratch easily, for instance if they touch each other and chafe against each other. Moreover, the semiconductor discs should not be soiled by the packing material. Therefore the surfaces of the discs must not touch the packing material, as they have done with previous methods of packing.

We have now devised a packing for semiconductor discs which avoids the difficulties of the prior art. It comprises a cylindrical can with a lid, containing a circular insert with two conical receiving surfaces situated opposite to each other and approaching each other at an angle, with wedge-shaped rabbets. In the center of the can there is a guide rod to which a down-holding bracket is attached consisting of lamellae which in their bottom side have rabbet-like grooves, so that a lamella stands above each pair of opposing wedge-shaped rabbets, and the down-holding bracket can be fixed by an arresting device at any height above the rabbets.

The packing of the invention is particularly suited for packing and shipping sawed, lapped and polished semiconductor discs. Depending on the design of the can, one can will hold from 10 to 100 discs.

The invention is described in connection with the accompanying drawings, in which.

Figure 1:
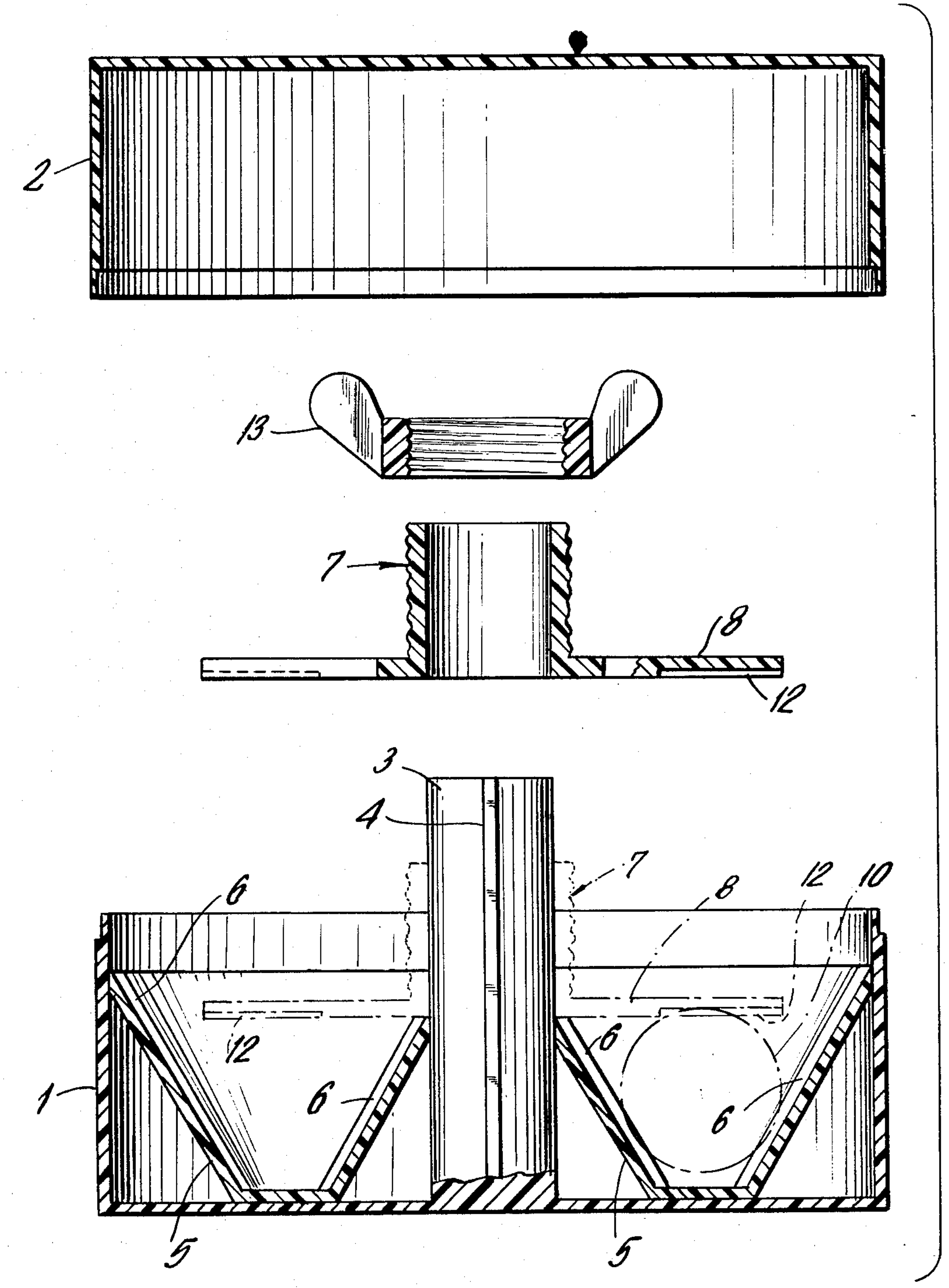
FIG. 1 is an exploded view of a packing device for semiconductor discs, embodying the invention.

The packing device shown in FIG. 1 comprises a cylindrical can 1 having a lid or cover 2 which nests snugly on said can. The lid may be tightly sealed to the can by adhesive tape. The can and lid may be made of plastic material, preferably polystyrol.

The can 1 has an axially disposed guide rod 3 having an asymmetrically arranged guide rail 4. Arranged about said rod 3 is an insert 5 having conical receiving grooves 6, the insert 5 being secured to the bottom of the can.

A hold-down bracket 7 is carried by the guide rod 3 and has circularly arranged plates 8 having wedge-shaped rabbets or grooves 9 in which the semiconductor discs stand vertically. Such a disc 10 is indicated in FIG. 1. On the bottom of plate 7 is a channel 12.

Figure 2:
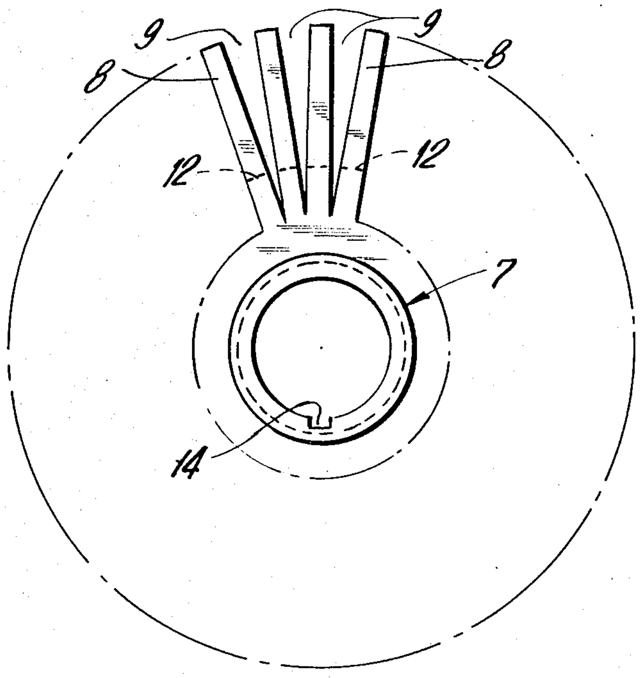
FIG. 2 is a top plan view of the hold-down bracket, showing the plate-like structure.
Figure 3:
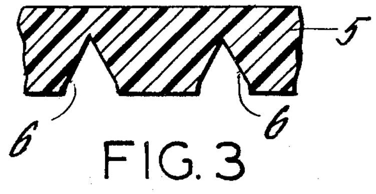
FIG. 3 is a detail section through a receiving surface with the wedge-shaped grooves, taken on line 3—3 of FIG. 4.
Figure 4:
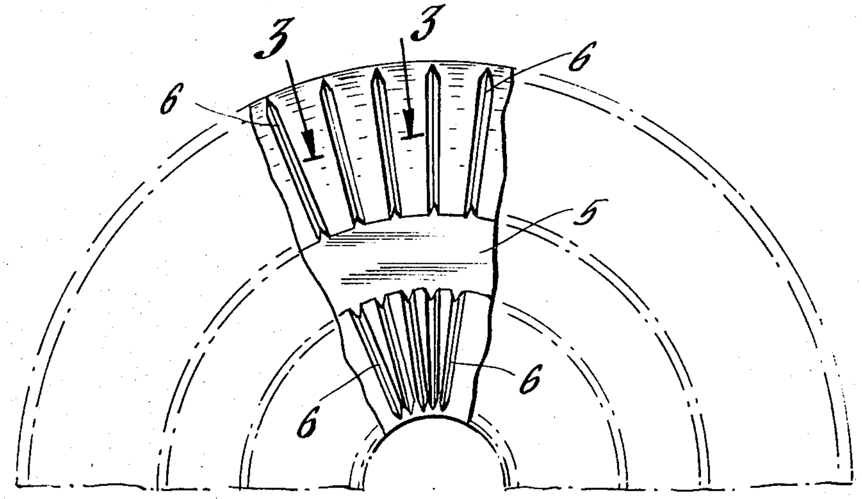
FIG. 4 is a top view of the insert, showing the receiving surfaces with the wedge-shaped grooves.

The hub of bracket 7 is threaded, and an arresting device or wing nut 13 is threaded thereon. Bracket 7 is slidable on guide rod and has a keyway 14 (FIG.2) which cooperates with guide rail 4.

Hold-down bracket 7 is shown in dotted lines in FIG. 1 with channels 12 engaging a disc 10, which disc is seated in grooves 6 of insert 5. The purpose of arresting device 13 is to frictionally tighten the hub of hold-down bracket 7 lightly onto guide rod 3.

It will be noted that the conical receiving grooves 6 are inclined trapezoidally toward each other, standing at an angle to the axis of the can and thus to guide rod 3. The angle formed by the extended receiving surfaces is preferably 40 to 100 degrees. As shown in FIG. 1, the discs 10 rest only on their edges, hence the surfaces of the discs do not touch the packing device at all.

For sawed or lapped semiconductor discs a soft plastic material has proven suitable, preferably "Styropor" (trademark of the BASF Company of Ludwigshafen, Germany). For polished discs, harder types of plastic, preferably polystyrol may be used.

The hold-down bracket 7 may be made of thermoplastic material, e.g. polypropylene, polycarbonate, or also of glass fiber reinforced polymers, and it has the purpose of holding the discs standing in the rabbets vertically to the bottom of the can.

Before the discs are inserted, the hold-down bracket is removed and when the desired number of discs has been inserted, the bracket is placed on the guide rod again and pushed down until the plates rest on the discs with a certain tension and hold them fast. Subsequently the hold-down bracket is arrested and the lid of the can is closed. To make the can absolutely dust-proof, the seam between the can and the lid may be sealed with adhesive tape.

The packing of the invention has the advantage that dust-proof shipment free of breakage is made possible for semiconductor discs, and that any subsequent cleaning of further processing is avoided. Moreover, the discs do not rest on their flat surfaces and they cannot scrape each other. With this packing it is possible to ship semiconductor discs of any kind, with various thicknesses and sizes, with equally good success.

The invention claimed is:

1. A packing for semiconductor discs comprising a cylindrical can, a lid for said can, a circular insert in said can having two conical receiving surfaces slanting toward each other and having wedge-shaped grooves therein, a guide rod in the center of said can, a hold-down bracket carried by said guide rod and comprising plates having rabbet-like grooves on their bottom sides, whereby a plate is positioned above each pair of wedge-shaped grooves facing each other, and an arresting device for holding said hold-down bracket above the rabbet-like grooves at any desired height.

2. A packing according to claim 1, in which said guide rod has asymmetrically arranged guide rails.

References Cited

UNITED STATES PATENTS

| | | | |
|---|---|---|---|
| 2,899,075 | 8/1959 | Gullixson | 211—40 |
| 2,906,408 | 9/1959 | Motyka et al. | 211—40 |
| 2,978,285 | 4/1961 | Jester | 220—22 |
| 3,467,242 | 9/1969 | De Rousse | 206—1 R |

WILLIAM T. DIXSON, Jr., Primary Examiner

U.S. Cl. X.R.

206—65 F; 211—40; 220—22